United States Patent Office 2,878,519
Patented Mar. 24, 1959

2,878,519

SURFACE TREATMENT OF POLYETHYLENE STRUCTURES

Leon E. Wolinski, Buffalo, N.Y., assignor to E. I. du Pont de Nemours and Company, Wilmington, Del., a corporation of Delaware No Drawing. Application February 11, 1955
Serial No. 487,701

5 Claims. (Cl. 18—48)

This invention relates to a process of treating the surface of polyethylene structures and, more particularly, to a process of treating the surface of a polyethylene film to promote the adhesion thereto of printing inks and various other materials.

This application is a continuation-in-part of my copending application Serial No. 347,392, filed April 7, 1953, now abandoned.

U.S. Patent 2,219,700 to Perrin et al. discloses and claims a polyethylene film i.e., a film of a solid polymer of ethylene. In general, polyethylene films are tough, semi-transparent, resistant to many chemicals, exhibit a high degree of moisture vapor impermeability, permit the passage of oxygen, and are heat-sealable. Because of this combination of properties, polyethylene films are highly useful for packaging and wrapping a great variety of materials such as chemicals, fresh produce, dried milk, textiles, hardware, etc. Probably the only troublesome disadvantage of polyethylene film for use in the packaging field is the fact that standard aniline and rotogravure printing inks employed for printing various cellulosic films, such as regenerated cellulose and cellulose acetate films, do not adhere satisfactorily to the surface of the film. Generally, any indicia, such as trademarks, advertising indicia, recipes, etc., imprinted upon a surface of a polyethylene film with standard oil or lacquer type inks employed for printing cellophane film are easily smeared or rubbed off by the normal abrasions suffered by packages during shipping, handling, etc. Hence, in order to obtain satisfactory adhesion between a dried ink and a polyethylene film surface, it is necessary to employ a specially compounded ink or modify the film surface to promote improved ink adhesion.

Although printing inks compounded particularly for printing on polyethylene films have been developed, the use of most of these inks requires modification of standard printing processes; and the preferred approach is treatment of the polyethylene film surface to promote adhesion of standard oil and lacquer type inks.

An object of the present invention is to provide a process of treating the surface of a polyethylene structure, e.g., film, to improve adhesion of standard printing inks, i.e., promote adhesion of standard aniline and rotogravure inks employed in printing on cellophane film. Another object is to provide a process of treating the surface of a polyethylene film to improve adhesion thereof to various other materials, such as metals, paper, nitrocellulose coatings, and other polymeric coatings, e.g., nylon, polyethylene terephthalate, etc. A further object is to improve the adhesion of polyethylene film to itself and other materials when using commercial adhesives. A still further object is to provide a process of treating the surface of a polyethylene film to improve adhesion thereto of dried ink impressions and not impair the transparency of the film. A still further object is to provide a polyethylene film having modified surface characteristics such that dried ink imprints on the surface will not rub off when tested in accordance with the various tests described hereinafter. Other objects will be apparent from the following description of the invention.

These objects are realized by the present invention which, briefly stated, comprises subjecting a polyethylene structure, e.g., polyethylene film, to the action of a bath maintained at a temperature within the range of from about 25° C. to about 90° C., and containing an agent selected from the group of oxy compounds consisting of hydrogen peroxide, nitrous acid, alkaline hypochlorites, concentrated nitric acid, and mixtures of concentrated nitric and sulfuric acids, for a period of time sufficient to render said structure adherent to printing ink.

In the normal process of extruding molten polyethylene into film form, a molding powder or flake of polyethylene is fed continuously into a melt extrusion machine, and the molten film continuously extruded through a slot orifice and through an air gap vertically downward into a quench bath maintained at a temperature from 25°–95° C., preferably from 30°–60° C. Usually, the polyethylene is extruded from a melt maintained at a temperature within the range from 150°–325° C., tubing is usually extruded from a melt at a temperature within the range from 150°–200° C., whereas film is extruded at a temperature within the range from 250°–325° C. An alternative process of forming a polyethylene film comprises milling molten polymer on closely-spaced calender rolls to form a film which is conducted vertically downward into a quench bath. In either of these general methods of forming a polymeric film, the space between the point where the molten film leaves the slot orifice or the last calender roll and the point where the molten film enters a quench bath will hereinafter be termed the "air gap." During passage through the air gap, the film is merely permitted to pass uninhibited through the atmosphere, and this provides for some superficial cooling. Generally, the length of the air gap ranges from about 2″ to as long as 15″ in some cases.

The process of the present invention is most conveniently carried out by subjecting freshly formed film to the action of the herein specified agents contained in a quench bath which, as pointed out, immediately follows the film-forming step in the normal processes of polyethylene film manufacture. Hence, the process of this invention may be carried out with substantially no modification of existing film-forming apparatus. Preferably, the quench bath is subjected to agitation by mechanical means or by employing sonic or supersonic waves, this agitation increasing the rate of action of the agents of this invention upon the polyethylene film. The rate of action may also be accelerated by exposing the film to ultra-violet light having a wave length no greater than 3900 A.U. during treatment in the quench bath. In the continuous production of polyethylene film treated in accordance with this process under commercially acceptable conditions, the time of treatment in the quench bath should not exceed 4 seconds.

Any agent selected from the group of oxy compounds consisting of hydrogen peroxide, nitrous acid, alkaline hypochlorites, concentrated nitric acid and a mixture of concentrated nitric acid and sulfuric acid may be employed in the quench bath for purposes of this invention. The conditioning agents may be employed in the quench bath in varying concentrations as illustrated in the examples presented hereinafter. Hydrogen peroxide has been employed in concentrations ranging from 0.24% to 32%, by weight of the total bath; and higher and somewhat lower concentrations are entirely operable. The same applies to the alkaline hypochlorites, but about 30% or higher is preferred. When nitric acid or mixtures thereof with sulfuric acid are used, the concentrated acids are preferred. The mixtures of concentrated nitric acid with concentrated sulfuric acid should contain at least 50% by weight of nitric acid, and preferably should contain a major proportion of nitric acid, i.e., more than 50% of concentrated nitric acid. If desired, the film after treatment with these agents may be passed into an aqueous bath containing a small amount of neutralizing agent; for example, film treated with nitric acid, mixed nitric and sulfuric acids, and nitrous acid may be passed into an aqueous alkaline neutralizing bath such as aqueous sodium hydroxide, or aqueous sodium bicarbonate containing about 2% hydrogen peroxide; film treated with alkaline hypochlorites may be neutralized in an aqueous solution containing a small amount of acid such as acetic acid. Film treated with hydrogen peroxide need not be neutralized.

For obtaining the desired physical characteristics in the polyethylene film, the quench bath is normally maintained at a temperature between 25° and 65° C. However, if the physical properties of the resulting film are not impaired or reduced below the minimum requirements for particular end uses, the use of higher quench bath temperatures, e.g., up to 90–95° C., permits shorter treatment times. In general, quench bath temperatures substantially higher than 65° C. do not sufficiently quench the film; and with slower cooling effected by higher bath temperatures, the polyethylene film formed is generally more crystalline and, consequently, has lower strength properties, lower flexibility and transparency, and the bond strengths of heat seals are considerably lower. Hence, quenching bath temperatures should normally be maintained below 65° C.

The following examples of specific preferred embodiments further illustrate the principles and practice of this invention.

Polyethylene film extruded from a melt was permitted to pass through an air gap of 10″ and then into an aqueous quench bath containing an agent of the present invention. Table I summarizes the conditions of treatment and the results obtained with respect to film printability.

Table I

| Composition of Quench Bath | Temp. Quench Bath, °C. | Melt Temp., °C. | Time in Quench Bath, Seconds | Printability |
|---|---|---|---|---|
| 0.24% aqueous $H_2O_2$ | 42 | 232 | 3.33 | Good. |
| 3.57% aqueous $H_2O_2$ | 30 | 232 | 2.86 | Do. |
| 31.8% aqueous $H_2O_2$ | 45 | 232 | 2.77 | Excellent. |
| Do | 90 | 232 | 1.43 | Do. |
| 30% aqueous sodium hypochlorite | 30 | 288 | 3.33 | Do. |
| Do | 90 | 288 | 1.0 | Good. |
| Conc. Nitric acid | 78 | 292 | 1.43 | Excellent. |
| Conc. $H_2SO_4$/Conc. $HNO_3$ (9 lbs./42 lbs.) | 90 | 288 | less than 0.4. | Do. |

In evaluating the printability, i.e., the strength of the adhesive bond between the dried ink and the treated polyethylene film surface, a number of tests were employed (5 in all); and, on the basis of the results of all of the tests, the films were rated either acceptable or not acceptable and, if acceptable, either excellent or good. Four different inks were employed to print the treated surfaces of polyethylene films, and each printed sample was evaluated in accordance with each of the five tests which will be described hereinafter. The inks employed were as follows:

No. 1 Aniline Cellophane Ink (Bensing Bros. and Deeney, No. W–400).
No. 2 Aniline Polyethylene Ink (Interchemical Corporation, No. PA-Red).
No. 3 Rotogravure Cellophane Ink (Bensing Bros. and Deeney, No. G–1037).
No. 4 Rotogravure Polyethylene Ink (Interchemical Corporation, IN-Tag-Red, GPA Red).

In preparing the printed samples of polyethylene film, the ink was applied with a commercial ink spreader which comprised a steel rod having fine wire wrapped around the rod. The spreader produced a multiplicity of fine lines. The ink was then dried for three minutes at 70° C. and thereafter permitted to cool to room temperature. Each sample was then tested in accordance with each of the following tests, and the amount of ink rubbed off and/or removed was noted:

(1) *Rub test.*—The inked polyethylene surface was rubbed ten times against a hard white paper.

(2) *Scratch test.*—The back of a fingernail was rubbed across the inked surface.

(3) *Flex test.*—The film was held between thumb and forefinger (2″ apart) and flexed vigorously.

(4) *Pressure-sensitive tape test.*—A pressure-sensitive tape was pressed against the printed surface, and then pulled off.

(5) *Twist test.*—The printed film was folded once and then again in a direction perpendicular to the first fold. The folded ends were then twisted once around and thereafter the film surface was examined for smearing and/or cracking of the dried ink.

Although the present process is employed primarily for treating the surface of a polyethylene film in order to produce a film which may be successfully printed with standard oil or lacquer type inks, e. g., aniline or rotogravure inks employed for printing on cellophane film, the present invention may be employed to modify the surface of a polyethylene film which is to be printed with inks which are especially modified for printing upon a polyethylene film surface. The net result is an even further improvement in the adhesive bonds between the dried ink and the polyethylene film surface. The present invention further provides for the preparation of a polyethylene film which is more readily adherent to metals, papers, and various coatings, such as those of nitrocellulose; polyamides, e. g., polyhexamethylene adipamide, polyhexamethylene sebacamide, N-methoxymethyl polyhexamethylene adipamide and other polyamides defined in U.S.P. 2,430,860, and interpolyamides defined in U.S.P. 2,285,009; polyethylene terephthalate; polyvinyl acetals such as polyvinyl butyral; ethyl cellulose; vinyl acetate-vinyl chloride copolymers; vinylidene chloride copolymers; chlorinated rubbers; etc. Furthermore, polyethylene film treated by the present process is more readily adhered to itself and other base materials by using commercial adhesives, e. g., standard adhesives employed for sealing cellophane.

The process of this invention may also be employed for treating the surface of various films fabricated from copolymers of ethylene with various other polymerizable materials, e. g., isobutylene, vinyl acetate, styrene, vinyl chloride.

The outstanding advantage of the present process is that it provides a readily applicable and rapid method of improving the adhesion of a dried printing ink to the surface of a polyethylene film. The process may be readily combined with a necessary step of extruding or calendering molten polyethylene into film or tube form, and the additional apparatus required is inexpensive and easy to install.

As many widely different embodiments may be made without departing from the spirit and scope of this invention, it is to be understood that said invention is in no wise restricted except as set forth in the appended claims.

I claim:

1. A process for treating structures of polyethylene which comprises subjecting said structures to the action of an agent selected from the group of oxy compounds consisting of aqueous solutions of hydrogen peroxide, nitrous acid, and alkaline hypochlorites, concentrated nitric acid, and mixtures of concentrated nitric acid and sulfuric acid containing at least 50% by weight of nitric acid, for a period of time sufficient to render said structures adherent to printing ink, and at a temperature within the range of from about 25° to about 95° C.

2. A process for treating polyethylene film which comprises subjecting the surface of said film to the action of an agent selected from the group of oxy compounds, consisting of aqueous solutions of hydrogen peroxide, nitrous acid, and alkaline hypochlorites, concentrated nitric acid, and mixtures of concentrated nitric acid and sulfuric acid containing at least 50% by weight of nitric acid, for a period of time sufficient to render said surface adherent to printing ink, and at a temperature within the range of from about 25° to about 95° C.

3. The process of claim 2 wherein the film is exposed to ultra-violet light having a wave length no greater than 3900 A.U. during the treatment in the quench bath and the quench bath is agitated.

4. The process of claim 2 wherein the temperature of said solution is maintained within the range of from about 25° to about 65° C.

5. In the process wherein molten polyethylene is continuously formed into continuous film and the freshly-formed film is continuously passed through an aqueous quench bath, the improvement which comprises passing said freshly-formed film through a quench bath containing an agent selected from the group of oxy compounds consisting of aqueous solutions of hydrogen peroxide, nitrous acid, and alkaline hypochlorites, concentrated nitric acid, and mixtures of concentrated nitric acid and sulfuric acid containing at least 50% by weight of nitric acid, and maintained at a temperature between about 25° and about 95° C., said film being in contact with the quench bath for a period of time sufficient to render the surface of the film adherent to printing ink.

No references cited.